No. 713,963. Patented Nov. 18, 1902.
C. CLARK.
SELF FEEDER FOR CLOVER HULLERS.
(Application filed Jan. 8, 1902.)

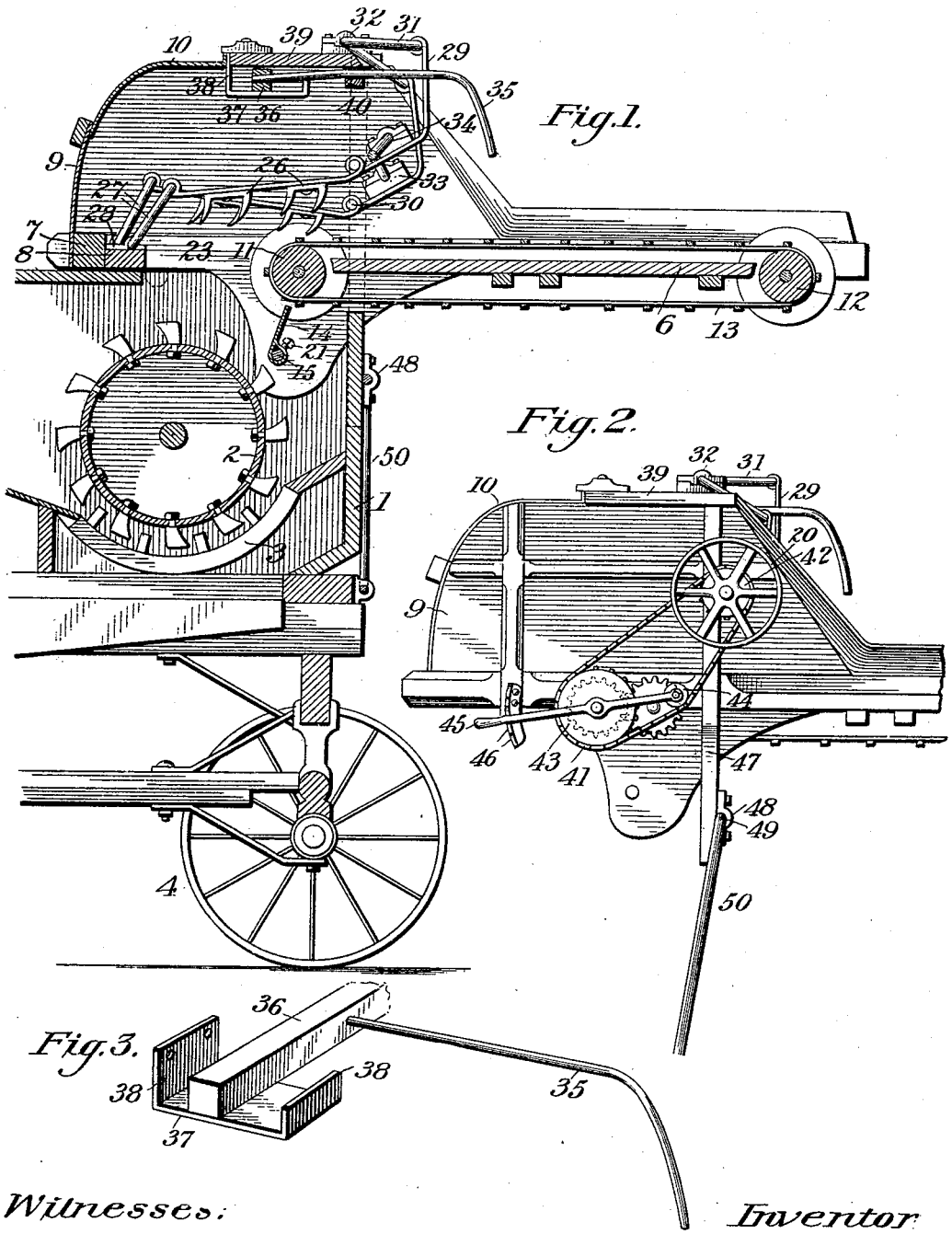

(No Model.) 2 Sheets—Sheet 2.

Witnesses:

Inventor:
Charles Clark.

UNITED STATES PATENT OFFICE.

CHARLES CLARK, OF WHITCOMB, INDIANA.

SELF-FEEDER FOR CLOVER-HULLERS.

SPECIFICATION forming part of Letters Patent No. 713,963, dated November 18, 1902.

Application filed January 8, 1902. Serial No. 88,913. (No model.)

*To all whom it may concern:*

Be it known that I, CHARLES CLARK, a citizen of the United States, residing at Whitcomb, in the county of Franklin and State of Indiana, have invented a certain new and useful Self-Feeder for Clover-Hullers, of which the following is a specification, reference being had therein to the accompanying drawings.

This invention relates to self-feeders for clover-hullers, having for its object to provide a simple, reliable, and effective attachment in the nature of a self-feeder capable of being readily applied to any of the modern types of clover-hulling machines for the purpose of uniformly feeding the clover to the threshing-cylinder and concave.

One of the principal objects of the present invention is to so construct and mount the frame of the feeder on the frame of the threshing-machine that the said feeder-frame may be thrown backward and simultaneously upward for giving more complete access to the threshing-cylinder and adjacent mechanism.

Another object of the invention is to combine with the feeder-apron an oscillatory butter or butt-board which is continually vibrated in close proximity to the apron where it passes around the inner feed-apron roller, the said butter or butt-board serving to free from the apron any litter or other material adhering to the apron.

Another object of the invention is to provide a series of feeder-rakes of novel construction and mounted in such manner as to secure a double action, said rakes serving not only to feed the clover in a continuous flow to the threshing-cylinder, but also to hold back the incoming clover resting on the feed-apron and prevent the same from coming in contact with or winding upon the crank-shaft which operates the rakes.

With the above and other objects in view, the nature of which will more fully appear as the description proceeds, the invention consists in the novel construction, combination, and arrangement of parts, as hereinafter fully described, illustrated, and claimed.

Figure 4:
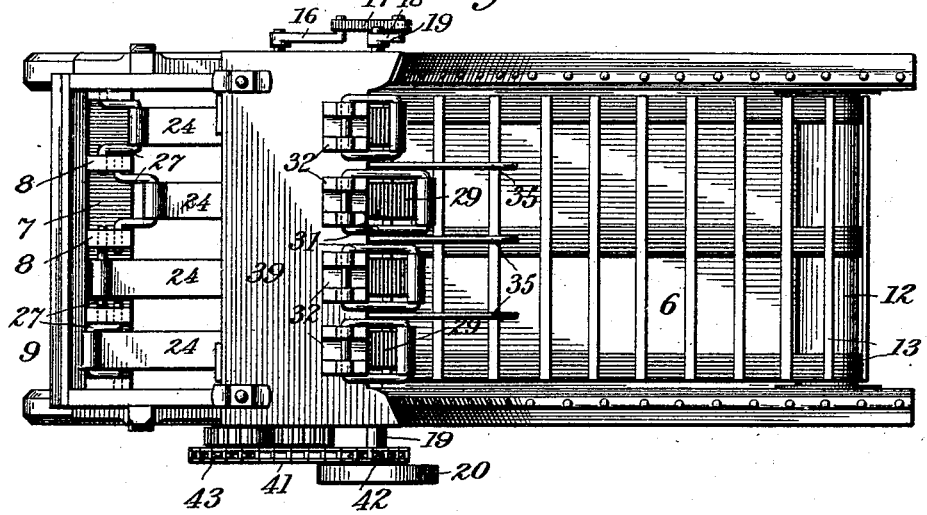
Figure 5:
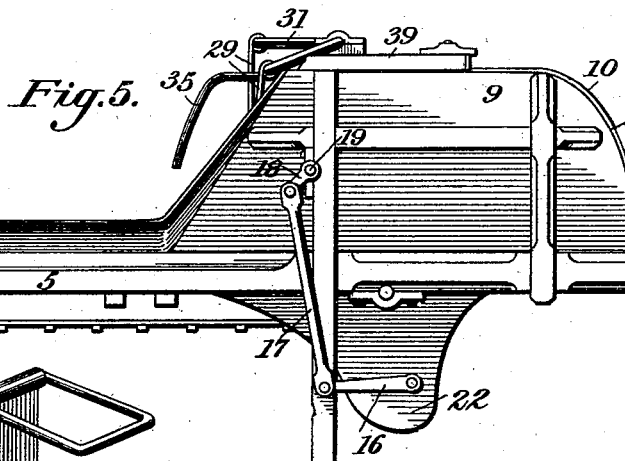
Figure 6:
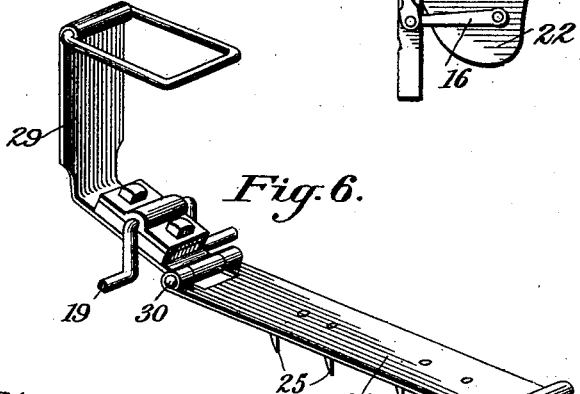

In the accompanying drawings, Figure 1 is a vertical longitudinal section through the improved self-feeder, showing also in section a sufficient portion of a threshing-machine or clover-huller to illustrate the application and relation of the feeder thereto. Fig. 2 is a detail side elevation of the feeder detached. Fig. 3 is a detail perspective view showing the sliding finger-bar and one of the guide-brackets by which said bar is supported. Fig. 4 is a plan view of the feeder. Fig. 5 is an elevation of the feeder looking from the side opposite that illustrated in Fig. 2. Fig. 6 is an enlarged perspective view of one of the double-acting feeder-rakes or, in other words, combined feeder-rake and fender.

Like reference-numerals designate corresponding parts in all figures of the drawings.

Referring to the drawings, 1 designates the frame or casing of a clover-hulling machine of the ordinary construction embodying a threshing-cylinder 2 and concave 3, the frame of the machine being mounted upon suitable carrying-wheels 4.

The feeder forming the subject-matter of this invention comprises, essentially, a pair of longitudinal side sills 5, connected by a substantially horizontal floor 6 and also by one or more transverse end sills 7 and cross-bar 8, which carries the bearings for the rockers, hereinafter referred to. The frame or casing of the feeder also comprises the oppositely-located side walls 9, between which the feeder-rakes operate, the farther end of the casing being closed by an end wall 9 and a detachable door 10, which is curved to correspond with the shape of the casing and by means of which access may be had to the interior mechanism.

At suitable points the frame of the feeder has mounted therein a pair of rollers 11 and 12, around which passes a feeder-apron 13, by means of which the clover is carried inward and delivered to the feeder-rakes. The inner feed-roller 11 is located partially over the threshing-cylinder 2, being arranged above the horizontal plane of the upper surface of the cylinder and in a vertical line between the front of the casing and the adjacent side of the cylinder, as clearly illustrated in Fig. 1.

Interposed between the cylinder 2 and the feeder-apron 13 is a vibratory butter or butt-board 14, the same being adjustably mounted on a transverse rock-shaft 15, provided at one end with a crank 16, located outside of the casing and coupled, by means of a connecting-rod 17, with a short crank 18 on a driving-shaft 19, which carries the driving-pulley 20. By the means described the butter is constantly vibrated, its free edge working in close proximity to the feeder-apron and serving to remove therefrom any litter or other material adhering to the apron. The butter 14 is adjustable on the shaft 15 by means of a set-screw 21. In order to provide for mounting the shaft of the butter at the point described, the casing of the feeder is provided with dependent extensions 22.

The material fed in by the apron 13 is delivered over the inner feed-roller 11 and passes through a discharge-throat 23, comprised between the feed-roller 11 and the cross-bar 8. Above the throat 23 is arranged a series of feeder-rakes, each consisting of a bar or strip 24, having secured thereto a series of teeth 25 in the form of curved hooks, which incline rearward, so as to drag the material from the apron 13 and force it downward upon the threshing-cylinder. By reference to Fig. 1 it will be seen that the teeth 25 are formed in pairs, each pair being connected with a common shank 26, while the shank is riveted or otherwise secured to the lower surface of the bar 24. Any number of double hooks or teeth may be employed. The feeder-rakes are arranged side by side, as shown in Figs. 1 and 4, and each rake is supported at its rear end by means of a rocker 27 in the form of a bail-shaped link, the lower end of which is journaled in a bearing 28, located upon the upper side of the cross-bar 8. As the feeder-rakes are moved back and forth the rear ends thereof describe an arc of a circle the radius of which is equal to the length of the rocker-links.

At their opposite ends the feeder-rakes are hingedly connected to and supported by the adjacent ends of a corresponding series of combined fenders and depressors 29. Each fender is bent intermediate its ends in substantially L shape and is connected with its respective feeder-rake 24 by means of a hinge-pin 30. The opposite or upper end of each fender is guided by means of a hanger-link 31, to one end of which the fender is pivotally connected, the opposite end of the link being mounted in a bearing 32 at the top of the feeder-casing. Adjacent to the hinge 30 each fender is provided with a bearing 33 for the reception of one of the cranks 34 of a multiple crank-shaft, which has been referred to above by the numeral 19. The crank-portions of said shaft extend in different directions, so as to cause the feeder-rakes and fenders to operate out of unison, in this way obtaining a practically continuous feed of the clover. By the specific arrangement of the rakes, fenders, and crank-shaft the rakes move simultaneously downward and rearward for catching the clover and dragging the same from the feeder-apron into the throat 23 and forcing said material downward through the throat upon the threshing-cylinder. The rakes then move upward and outward, readily freeing the teeth from the material operated upon.

The fenders 29 operate between a series of guard-fingers 35, which overhang the feeder-apron 13. These fingers are all connected to a common head or sliding finger-bar 36, which extends transversely across the feeder-casing and has its opposite ends supported by a pair of guide-brackets 37, embodying end stops or flanges 38, one of which is extended upward far enough to enable it to be fastened to the top 39 of the casing. At another point the fingers 35 are supported by a cross-rail 40. The fingers 35 serve to hold back a portion of the clover and prevent it from flowing inward too rapidly to the threshing mechanism. Any surplus of clover passing by the fingers 35 is operated upon by the fenders 29, which have a forward and downward movement, the effect being to kick the clover away from the crank-shaft 19 and prevent it from becoming wound around said shaft. If the clover is forced inward with too great a pressure, the fingers 35 may slide inward, due to the movement of the sliding finger-bar. As the clover finds its way between the fingers and the fenders the latter operate upon the clover and force the same backward, at the same time causing the clover to bank up beneath the fingers and force the latter again outward. In this way the inflowing clover is agitated and loosened up and at the same time kicked away from the operating-shaft 19.

Motion is imparted to the inner feed-roller 11 and feeder-apron 13 by means of a belt or chain 41, which passes around a wheel 42 on the shaft 19 and around a similar wheel 43 on the shaft of the roller 11, as shown in Fig. 2. In connection with said chain or belt 41 I employ a chain-tightener wheel or pulley 44, which is carried by one end of a lever 45, that engages a rack 46 on the feeder-casing, as shown in Fig. 2.

Another important feature of this invention resides in the manner of supporting the feeder-casing, so that it may be rocked simultaneously upward and outward for the purpose of giving access to the operative mechanism of the clover-huller. In carrying out this part of the invention the frame or casing of the feeder is provided at opposite sides with downwardly-extending posts 47, having bearings 48, in which is received the upper portion or cross-bar 49 of a swinging bail-shaped frame 50, the lower portion of which is pivotally connected to the frame of the clover-hulling machine, preferably by journaling the said lower portion of the bail-shaped frame in bearings mounted on the clover-huller. Thus the bail-shaped frame is pivotally connected to the machine-frame at a point below the horizontal plane of the threshing-cylinder or the shaft thereof, while the frame of the feeder is pivotally connected with or journaled upon the upper portion of the said bail-shaped frame. In throwing back the feeder the latter may therefore swing either upon the upper portion of the bail-shaped frame or it may be swung from the lower portion of said frame as a center. This gives ready access to the threshing-cylinder and adjacent parts. When the feeder is in its operative position, the side sills 5 thereof rest upon the top of the clover-hulling machine, as shown in Fig. 1.

The self-feeder hereinabove described is applicable to any well-known clover-hulling machine. It operates to feed the clover downward upon the top of the threshing-cylinder instead of against the front of the cylinder. The rakes by their particular movement feed inward and downward only the requisite quantity of material, while the fenders regulate the flow of material to the rakes. The butter or butt-board removes any material adhering to the feeder-apron and in connection with the rakes and fenders and guard-fingers prevents the choking of the machine.

I do not desire to be limited to the details of construction hereinabove set forth, and accordingly reserve the right to change, modify, or vary the construction within the scope of the appended claims.

Having thus described my invention, what I claim as new, and desire to secure by Letters Patent, is—

1. The combination with a clover-huller and the threshing-cylinder thereof, of a relatively movable feeder frame or casing, feeding mechanism mounted therein and comprising a traveling apron having its inner end arranged to discharge directly over and upon the threshing-cylinder, fulcrum-posts rigidly connected with the feeder-frame and extending downward from the feeder, and a swinging bail connected at one end to the bottoms of said posts and at the opposite end to the machine-frame at a point beneath the horizontal plane of the threshing-cylinder.

2. In a self-feeder for clover-hullers, the combination with the frame of the feeder, of a feeder-apron mounted therein, a sliding finger-bar provided with guard-fingers overhanging the feeder-apron, fenders working between the guard-fingers, feeder-rakes, and means for operating the fenders and rakes, substantially as described.

3. In a self-feeder for clover-hullers, a frame or casing, an endless feeder-apron mounted therein, a series of feeder-rakes operating above and adjacent to the delivery end of said apron, combined L-shaped fenders and depressions connected with the feeder-rakes and forming extensions thereof, and a crank-shaft for operating the feeder-rakes and fenders.

4. In a self-feeder for clover-hullers, the combination with the frame or casing of the feeder, of a feeder-apron mounted therein, a series of feeder-rakes operating adjacent to the delivery end of said apron and above the threshing-cylinder, a corresponding series of combined fenders and depressors having a hinged connection with the rakes, and a crank-shaft for simultaneously operating the fenders and rakes.

5. In a self-feeder for clover-hullers, the combination with a feeder frame or casing, of a feeder-apron mounted therein, a plurality of guard-fingers overhanging the apron, a series of oscillatory fenders working between the fingers, a crank-shaft for operating said fenders, and a corresponding series of feeder-rakes actuated by the fenders and having their opposite ends supported by and upon underlying rockers.

6. In a self-feeder for clover-hullers, the combination with the frame or casing of the feeder, of a feeder-apron mounted therein, a sliding finger-bar provided with a series of guard-fingers overhanging the feeder-apron, oscillatory fenders working between the guard-fingers, a crank-shaft for operating the fenders, and feeder-rakes having a hinged connection with the fenders and supported at their ends by rockers.

7. In a self-feeder for clover-hullers, the combination with the frame or casing of the feeder, of a feeder-apron mounted therein, a series of guard-fingers overhanging the apron, a finger-bar to which the fingers are connected, guide-brackets in which the finger-bar is adapted to slide longitudinally of the machine, oscillatory fenders working between the fingers, a crank-shaft for imparting movement to said fenders, and a series of feeder-rakes, each of which is hingedly connected at one end to one of the fenders and supported at its opposite end by a swinging bail or rocker.

8. In a self-feeder for clover-hullers, the combination with a feeder frame or casing, of a feeder-apron mounted therein, a series of combined feeder-rakes and fenders located above the delivery end of the feeder-apron and having a jointed connection with each other, pivotal links connecting the tops of the fenders with the upper part of the feeder-frame, rocker-links at the inner and lower portion of the feeder-frame and connected at their upper swinging ends with the rakes, and a crank-shaft for actuating the said rakes and fenders.

9. In a self-feeder for clover-hullers, the combination with the machine-frame and cylinder therein, and a relatively movable feeder frame or casing, of a feeder-apron mounted in the feeder-frame, and having the inner feed-roller located above the threshing-cylinder having bearings in the movable feeder-frame and a rock-shaft arranged close to the sweep of the cylinder-teeth and between the cylinder and discharge end of the apron, a vibratory butter or butt-board on the rock-shaft and interposed between the threshing-cylinder and inner feed-roller and also arranged with its free upper edge adjacent to the inner feed-roller, and means for automatically vibrating said butter.

In testimony whereof I affix my signature in presence of two witnesses.

CHARLES CLARK.

Witnesses:
S. E. O'BYRNE,
AL. CLARK.